United States Patent [19]

Hodge

[11] 4,245,885
[45] Jan. 20, 1981

[54] FIBER OPTIC RELAY SWITCH FOR PRECISE FIBER ALIGNMENT AND METHOD OF MAKING THE SAME

[75] Inventor: Malcolm H. Hodge, Claymont, Del.

[73] Assignee: TRW Inc., Cleveland, Ohio

[21] Appl. No.: 955,690

[22] Filed: Oct. 30, 1978

[51] Int. Cl.³ .............................................. G02B 5/14
[52] U.S. Cl. ................................. 350/96.20; 65/4 A; 350/96.15; 350/320
[58] Field of Search .............. 350/96.15, 96.16, 96.20, 350/96.21, 96.22, 96.23, 320; 65/4 R, 4 A

[56] References Cited

U.S. PATENT DOCUMENTS

| | | | |
|---|---|---|---|
| 4,033,669 | 7/1977 | Hanson | 350/96.20 X |
| 4,047,796 | 9/1977 | Kao et al. | 350/96.21 |
| 4,099,832 | 7/1978 | Warner, Jr. | 350/96.21 |
| 4,109,994 | 8/1978 | Chown | 350/96.21 |
| 4,123,139 | 10/1978 | Sandahl | 350/96.21 |
| 4,132,461 | 1/1979 | Jacques et al. | 350/96.20 |
| 4,161,347 | 7/1979 | Tardy | 350/96.21 |

FOREIGN PATENT DOCUMENTS

| | | | |
|---|---|---|---|
| 521839 | 8/1953 | Belgium | 65/4 A |
| 2291510 | 6/1976 | France | 350/96.21 |
| 1486764 | 9/1977 | United Kingdom | 350/96.23 |

*Primary Examiner*—John K. Corbin
*Assistant Examiner*—John D. Lee
*Attorney, Agent, or Firm*—Neuman, Williams, Anderson & Olson

[57] ABSTRACT

A fiber optic relay switch is provided for switching an optic signal between at least a first optic fiber and at least two other optic fibers, i.e., a second and third optic fiber. The switch comprises a first section housing the first fiber and second section housing the second and third fibers. Each section comprises a central rod and a plurality of rods spiraling helically about the central axis to form a plurality of helically extending cusp-shaped interstitial channels. The sections are aligned and each terminates in a coupling face. The fibers are disposed within pre-selected cusps of the helical channels and with their ends aligned with the contact face of the section in which they are disposed. The sections are rotatable about the longitudinal axis of the central rod. When the sections are rotated to a first angular position relative to each other the first fiber is aligned and optically coupled to the second fiber and when the sections are rotated to a second angular position relative to each other the first fiber is aligned and optically coupled to the third fiber.

In one embodiment the cusp-shaped channels spiral helically up to the coupling face. In a preferred embodiment the channels spiral helically only up to a point located to the rear of the coupling face and from that point to the coupling face are linear and parallel to the longitudinal axis of the central rod.

Means are provided in either embodiment for effecting the relative rotation between the sections and for holding the sections in position once they are rotated to said position.

44 Claims, 9 Drawing Figures

FIBER OPTIC RELAY SWITCH FOR PRECISE FIBER ALIGNMENT AND METHOD OF MAKING THE SAME

This invention relates generally to fiber optics and, more particularly, to a fiber optic relay switch which enables the switching of optical signals between a first fiber and a second and a third fiber.

In U.S. Patent application Ser. No. 856,440, filed on Dec. 1, 1977, which is assigned to the same assignee as the instant invention and whose disclosure is incorporated by reference herein, a co-inventor and I disclosed and claimed a fiber optic relay switch which effects the relaying of optic signals between at least a first and a second optical path. That relay switch basically comprises a pair of cylindrical members which are axially aligned and preferably rotatable with respect to each other. One cylindrical member houses at least a first optic fiber while the other member houses at least a second and a third optic fiber. Each member includes a coupling face. The first fiber is terminated with its end being aligned with the coupling face of the first member, while the respective ends of the second and third fibers are terminated aligned with the coupling face of the second member. The cylindrical members are arranged to be rotated to a predetermined angular displacement between a first and a second position. In the first position the first fiber is aligned with the second fiber. In the second position the first fiber is aligned with the third fiber. Accordingly, rotation of the cylindrical members between the first and second positions enables the switching of optical signals from the first fiber to either of the second or third fibers.

While the relay switch of my aforenoted co-pending patent application is generally suitable for its intended purposes, to operate most efficiently, that is with the least light lost across the fiber interfaces, relative close size tolerance optic fibers must be used since the use of such matching fibers ensures that the fibers within each cylindrical member are located at precise positions therein. Moreover, in those embodiments of that application, wherein the cylindrical members are arranged to be rotated about a central axis to effect the switching of signals between different optical paths, it is of considerable importance that the fibers forming the paths be located at the same radial distance from the axis about which the members are rotated and at the same mutual angular displacement thereabout to minimize the signal loss across the interface of the fibers forming the signal paths. This factor also necessitates the use of precisely dimensioned fibers and cylindrical members in order to ensure precise positioning of the fibers and the resultant sufficiently precise fiber-to-fiber interface desired to minimize light loss.

It is a general object of the instant invention to provide a relay switch which overcomes the disadvantages of the prior art and which is an improvement over the relay switch disclosed and claimed in my aforementioned co-pending patent application.

It is a further object of the instant invention to provide a fiber optic relay switch which enables at least a first optic fiber to be accurately optically aligned with a similar optic fiber and then to be swtiched into accurate optical alignment with another optic fiber despite lack of close dimensional tolerance.

It is still a further object of the instant invention to provide a fiber optic relay switch which is fabricated inexpensively and easily and which can be mass manufactured.

It is yet a further object of the instant invention to provide a fiber optic relay switch which utilizes a pair of aligned housing sections, each including cusp-shaped interstitial channels arranged for holding an optic fiber in a predetermined cusp thereof, and wherein the sections are slid relative to each other to enable the precise axial and angular alignment of the fiber in one section to either one of at least two fibers in the second section.

It is yet another object of this invention to provide a method of making the housing sections for said fiber optic relay switch.

These and other objects of the instant invention are achieved by providing a fiber optic relay switch for switching optical signals at least between a first fiber and a second and a third fiber. The switch comprises a first section housing a first optic fiber and a second section housing at least a second and a third optic fiber. The first and second sections each comprise a central rod having a longitudinal central axis and a plurality of peripheral rods surrounding the central rod to form a plurality of cusp-shaped interstitial channels therebetween. The peripheral rods spiral helically about the axis for at least a portion of the section so that the channels in the portion extend helically about the central rod. Each of the sections terminates in a coupling face. Each of the channels includes three cusps formed between the central rod and two contiguous peripheral rods. One of the cusps is located furthest from the axis and formed between the two contiguous peripheral rods. The other two cusps are located laterally of the one cusp and closer to the axis, with each central cusp being formed between the central rod and a respective one of two said contiguous rods. The first fiber is located within a pre-selected cusp of a channel in the first section and with the end of the first fiber being aligned with the coupling face of the section. The second fiber is located within a pre-selected cusp of a channel in the second section and with the end of the second fiber aligned with the coupling face of the second section. The third fiber is also located within a preselected cusp of another channel in the second section and with its end aligned with the coupling face of the second section. The coupling faces of the first and second sections are slideably disposed with respect to each other so that in a first position the end of the first fiber is aligned with and optically coupled with the end of the second fiber and in a second position the end of the first fiber is aligned with and optically coupled with the end of the third fiber, whereby movement of the sections relative to each other between the first and second positions switches the optical signals from a first path to a second path. Of course, there may be more than one fiber in the first section, up to the number of channels, and similarly in the second section, so that switching may occur in a large variety of differing paths.

In a preferred embodiment of the relay switch the peripheral rods in the portion of the section contiguous with the coupling face extend linearly parallel to the axis so that the channels in that portion extend linearly parallel to the axis. This embodiment has a particular effect on the pre-selection of the cusp in which the fiber is located at the coupling face of the section, as will be described later.

Other objects and many of the attendant advantages of the instant invention will be readily appreciated as the same becomes better understood by reference to the following detailed description when considered in connection with the accompanying drawing wherein:

Figures 1, 2, 3, 8B:
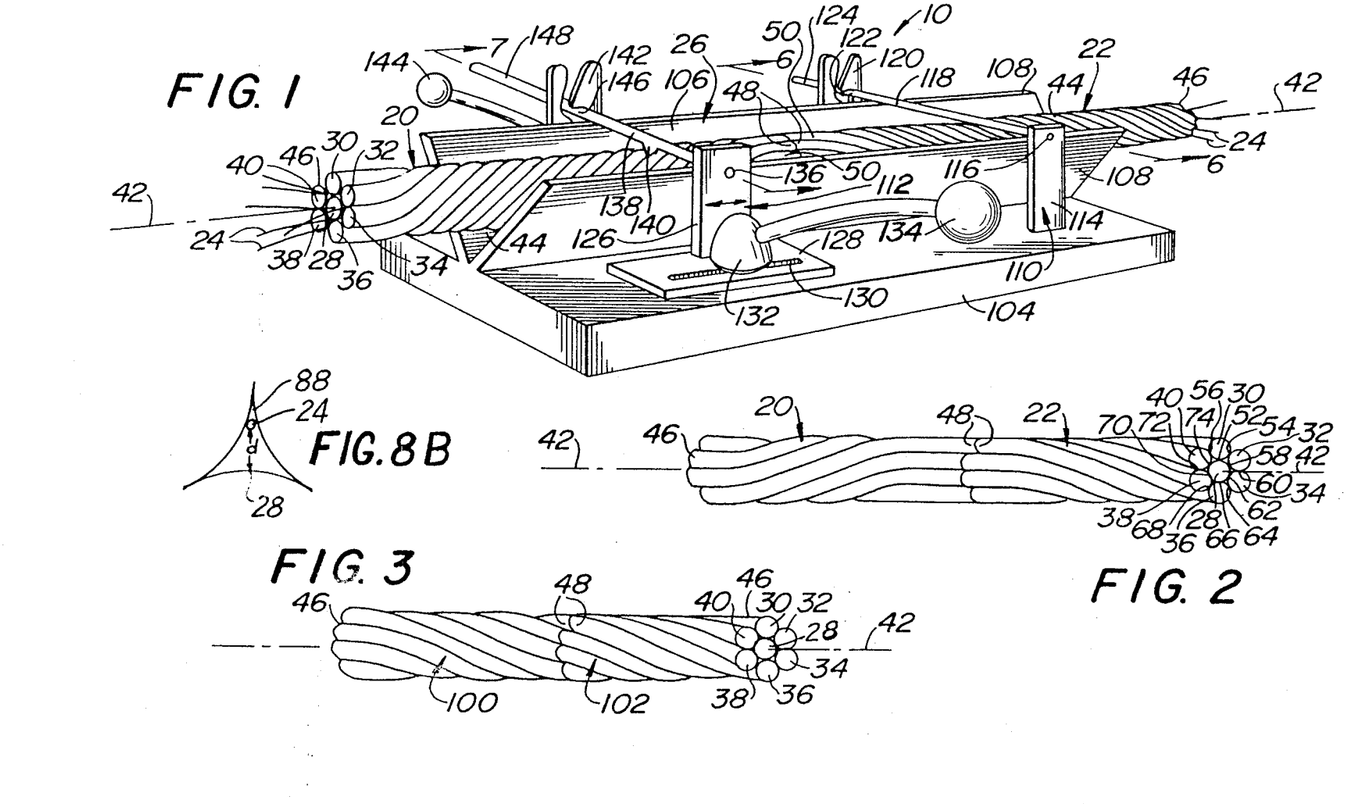
FIG. 1 is a perspective view of the fiber optic relay switch of the instant invention and including a preferred embodiment of a pair of fiber housing sections.
FIG. 2 is a perspective view of the preferred pair of fiber housing sections.
FIG. 3 is a perspective view, like that of FIG. 2, but showing an alternative embodiment of a pair of fiber housing sections.
FIG. 8B is an enlarged end view of the channel portion shown in FIG. 8A.

Referring now to the drawings wherein like reference characters refer to like parts, there is shown generally at 10 in FIG. 1 an improved relay switch in accordance with a preferred embodiment of this invention. The switch 10 basically comprises a pair of housing sections 20 and 22, each adapted to support and hold an arrayed plurality of optic fibers 24, and alignment means 26 for supporting and holding the housing sections in alignment along their central axis and to enable them to be rotated about the axis through various rotational positions to optically align fibers held in one section with fibers held in the other section.

The housing sections 20 and 22 are of substantially identical construction. Each section is made up of an assembly of cylindrical members, preferably formed of glass, the members being disposed parallel to one another in a side-by-side array with abutting peripheral surfaces in contact. The members may be held together by any convenient means but are preferably connected to each other to form an integral unit and such a unit will be described hereinafter. As shown clearly in FIGS. 2 and 4, each section includes an elongated and linear cylindrical member 28 and a plurality of peripheral cylindrical members 30, 32, 34, 36, 38 and 40 disposed in a side-by-side array parallel to one another about the periphery of the central member 28, to form a plurality of cusp-shaped interstitial channels between themselves and the central member 28. The channels serve to hold the optic fibers 24 within each housing section at pre-selected precise locations and will be described in considerable detail later. The peripheral members of each section spiral helically about the central member 28 for a portion 44 of the length of each section but in opposite rotational directions, as shown in FIG. 2.

Figures 4, 5, 6, 7, 8A:
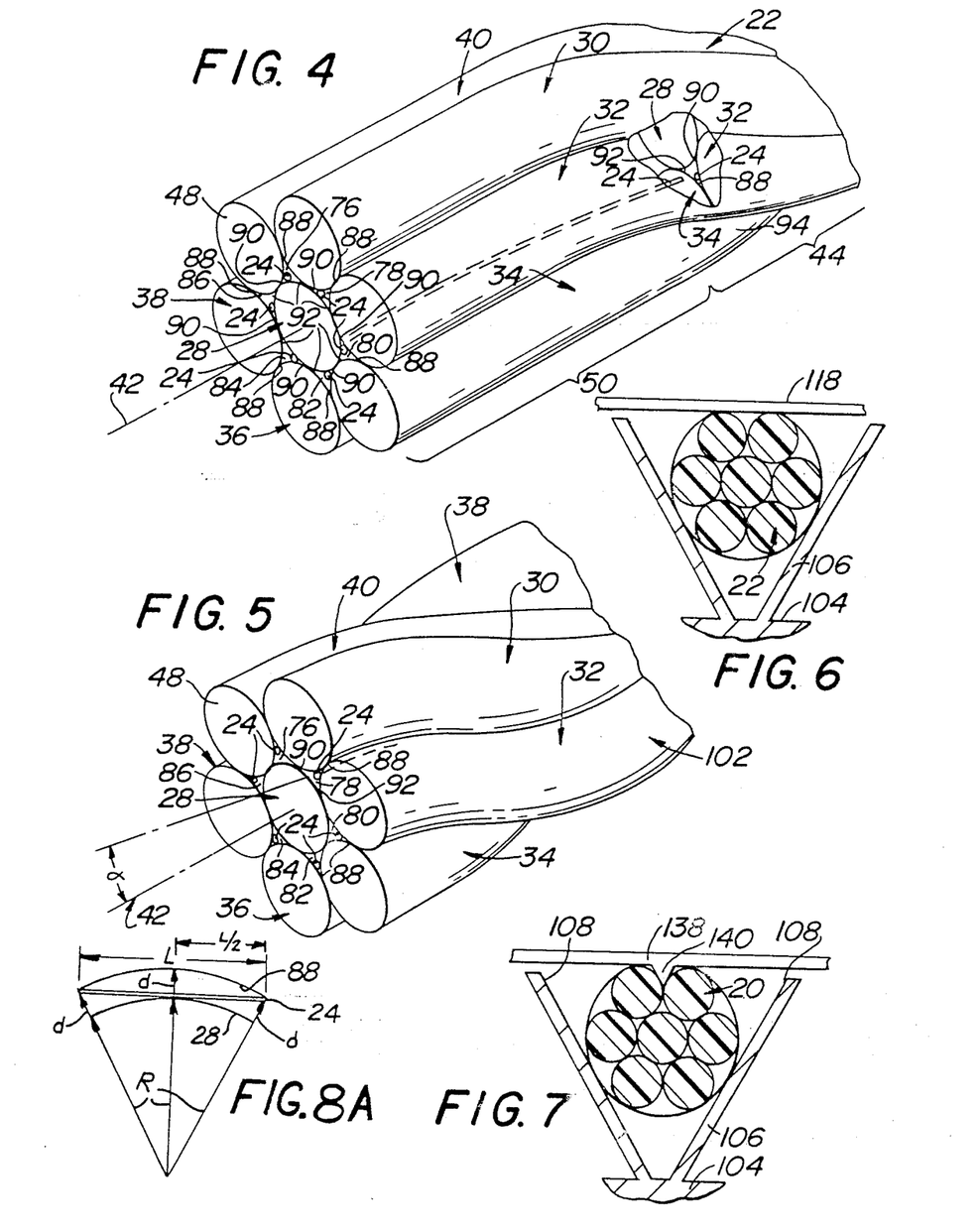
FIG. 4 is an enlarged perspective view of one end of a fiber housing section shown in FIG. 2 including a cut-away section.
FIG. 5 is an enlarged perspective view of one end of a fiber housing section shown in FIG. 3.
FIG. 6 is a sectional view taken along the line 6—6 of FIG. 1.
FIG. 7 is a sectional view taken along the line 7—7 of FIG. 1.
FIG. 8A is a schematic diagram of a cross section of a portion of a typical fiber holding channel of the invention.

Each housing section includes a pair of ends 46 and 48. The end 48 of each section is in the form of a planar surface extending normally to the central axis 42 and which is adapted to engage the corresponding surface of the other housing section and is referred to hereinafter as a contact face 48.

In accordance with the preferred aspect of the instant invention, the peripheral rods 30–40 extend linearly parallel to the axis 42 in the portion 50 of each section contiguous with the contact face 48. This feature results in the creation of straight, longitudinally extending, fiber-holding channel portions terminating at the contact face 48.

It must be pointed out of this juncture that while the glass cylindrical members 28–40 are shown in the drawings herein as being composed of solid rods, such a construction is not critical to the invention and thus any or all of the members may be of alternative construction, e.g., tubular rods, so long as their outer periphery at the portions which form the walls of the fiber holding channels form arcuate cusp-shaped interstices.

As stated heretofore the rods are connected together along their contiguous longitudinally extending peripheral surfaces. To that end as can be seen in FIG. 2 the peripheral rod 30 is connected to central rod 28 and the two lateral peripheral rods 32 and 40 along junction lines 52, 54 and 56, respectively. Similarly, peripheral rod 32 is connected to central rod 28 and lateral peripheral rods 34 and 30 along junction lines 58, 60 and 54, respectively, peripheral rod 34 is connected to central rod 28 and lateral peripheral rods 36 and 32 along junction lines 62, 64 and 60, respectively, peripheral rod 36 is connected to central rod 28 and lateral peripheral rods 38 and 34, along junction lines 66, 68 and 64, respectively, peripheral rod 38 is connected to central rod 28 and lateral peripheral rods 40 and 36 along junction lines 70, 72 and 68, respectively, and peripheral rod 40 is connected to central rod 28 and lateral peripheral rods 30 and 38 along junction lines 74, 56 and 72, respectively.

As mentioned earlier, and as shown in FIG. 4, the disposition of the peripheral rods about the periphery of the central rod 28 and their connection thereto and to one another results in the creation of six cusp-shaped interstitial channels 76, 78, 80, 82, 84 and 86 extending throughout the length of each section and spiraling about the central axis 42 in the portion 44 of the section. The portion of each channel within the housing section portion 50 which is contiguous with the face 48 is straight and extends parallel to the longitudinal central axis 42.

As can be clearly seen in FIG. 4 each channel is of a tricuspid cross-section and includes an outer cusp-shaped interstice of cusp 88 formed between contiguous peripheral rods and a pair of laterally disposed cusp-shaped interstices or cusps 90 and 92, each formed between the central rod and a respective peripheral rod. The outer interstice 88 is located further outward radially from the central axis 42 of the central rod 28 than are the lateral interstices 90 and 92. Both lateral interstices extend the same radial distance from the central axis 42.

Each channel of each section is arranged to hold an optic fiber 24 therein for optical engagement with an optic fiber 24 held within a channel in the other section. To that end in accordance with the instant invention each optic fiber within each housing section is disposed within a pre-selected cusp of its channel in the section.

In the preferred embodiment of the invention shown in FIG. 1, 2 and 4 each optic fiber 24 automatically extends linearly within lateral interstice 90 of the straight channel portion contiguous with the contact face 48 of the housing section 22 while each fiber 24 in the housing section 20 also automatically extends linearly within lateral interstice 90 of the straight channel portion contiguous with its contact face. This action occurs since the peripheral rods of each housing section spiral helically in opposite rotational directions, as noted heretofore.

As will be discussed in detail later, in the embodiment shown in FIGS. 3 and 5, each optic fiber in the helical spiral portion 44 of the channel contiguous with its contact face is automatically disposed within the outer cusp-shaped interstice 88.

In accordance with all of the embodiments of the invention shown herein the diameter of each of the peripheral rods 30-40 is the same so that all the cusp-shaped interstitial channels 76-86 are located the same radial distance from the central axis 42 of the section and are equidistantly spaced from each other. More particularly, the corresponding cusps are located the same radial distance from the central axis 42 and a predetermined angular distance from the corresponding immediately adjacent cusp. This feature ensures that an optic fiber disposed within a pre-selected cusp in any channel in one section can be efficiently, optically coupled to any fiber disposed within a pre-selected cusp in the channel in another section by merely rotating the sections about axis 42 relative to one another until the two fibers are aligned. This action will be described in considerable detail later. Suffice for now to state that if the cusp-shaped interstices of one section are spaced apart by the same angular distance and are on the same radius as cusp-shaped interstices of the other section, the interstices can be aligned in various positions by merely rotating the sections relative to one another by the angle or integer multiple of the angle separating the interstices. Thus, if the fibers are located with corresponding cusps in one section they can be aligned with fibers in corresponding or different cusps in the other section, if the angular distance between the cusps holding the fibers in both sections are the same and the radial distance between the cusps are the same in both sections.

It should be noted that the diameter of the central rod in the embodiments shown is also equal to the diameter of the peripheral rods, although such a construction is not critical.

In accordance with one aspect of this invention, so long as the curvature of the channel holding a fiber therein is sufficient to impress a biasing bending moment on the fiber, the fiber will naturally assume a position in the outermost cusps 88 at the ends of the channel. To that end FIG. 8A shows a schematic diagram of an arcuate channel representing a cross section of any helical spiral channel portion in the housing sections of the instant invention. FIG. 8B is an end view of the channel portion shown in FIG. 8A. The view of FIG. 8A represents the limiting condition for a fiber 24 to be located within the outer cusp-shaped interstices 88 at the ends of the channel portion. As will be appreciated by those skilled in the art, by using the phythagorean theorem, for any given length L of arcuate channel the fiber 24 will be located within the outer cusps 88 at the ends of the channel whenever the radius of curvature R of the arcuate channel is defined as follows:

$$R < (L^2 - 4d^2)/8d$$

where d is the channel slack, that is the space between the fiber and the opposed channel surface, as shown in FIG. 8B. As will also be appreciated by those skilled in the art the optic fiber portion located within any helical spiral portion of the interstitial channel is bent over an arc whose radius is that of the larger axis of an elliptical cross-section of the housing section tangent to the pitch of the peripheral rods forming the channel. Accordingly, the fiber located within the helical spiral channel portion will automatically assume a position within the outermost cusp at the ends of the spiral portion 44 of each section so long as the pitch of that portion is such that the radius of curvature of the ellipse is less than $(L^2 - 4d^2)/8d$.

It has been found that exemplary effective housing sections for use with five mil diameter fibers are formed of rods of 60 mil diameter and having a minimum spiral pitch of approximately 3 inches (76.2 mm) for a one-inch (25.4 mm) housing section.

As will be appreciated by those skilled in the art, if there is any channel slack the longitudinal axis of each fiber where it emerges from the helical spiral portion 44 of the channel will be at an angle to the longitudinal axis of the central rod 42. The angle may be substantial, e.g., 45 degrees. FIG. 5, which shows the contact face portion of the housing section constructed in accordance with an alternative embodiment of the invention and to be described later, also illustrates a transverse cross-section of either of the housing sections, 20 or 22, at the point at which helical portion 44 ends, i.e., the transition point 94 at which the peripheral rods begin to straighten out, and shows the angled orientation of the fibers thereat.

Im most applications there will be channel slack, thus the fibers emerging from the helical spiral portion 44 extend at a compound angle α to the longitudinal central axis 42. To that end in FIG. 5 the angle α shown represents the angle between the axis of the emerging fiber end and an axis parallel to central axis 42 and intersecting the axis of the emerging fiber end. The straight, longitudinally extending portions of the channels of the preferred embodiment shown in FIGS. 1, 2 and 4 serve to bring each of the fibers back on axis, that is, parallel to the axis 42 of the central rod 28. This feature ensures that when the fibers in one section abut the fibers in the other section, the abutting fibers are aligned axially as well as angularly, to produce a good light transmissive joint.

The straight channel portions, by changing the direction of the fibers from the helical spiral path to the linear path, also produce a lateral force on the fibers. If the force is greater than that arising from the fiber's natural outward tendency, then during assembly of the housing section each fiber slides out of the outer interstice 88 and into the lateral interstice 90, which constitutes the straightest path around the bend in the transition portion 94 of the housing section.

I have determined that the location of the fiber within a lateral interstice 90 automatically occurs whenever the following mathematical condition is met:

$$P > \frac{2R_2 (R + r)^2}{(2R + r^2)^{\frac{1}{2}}}$$

where P is the pitch of the helical spiral portion 44, $R_2$ is the radius of curvature in the transition portion 94, R is the radius of central rod 28 and r is the radius of the fiber 24.

If the above defined mathematical condition is not met then the fibers in each section remain in the outer interstice 88. In order to ensure that the fiber is located in either the outer interstice 88 or the lateral interstice 90, the marginal fulfillment of the above defined condition should be avoided since it does not take into account gravitational or frictional effects.

After the fibers are located as described, they are permanently secured in place, such as by the use of epoxy, etc., in the housing channels and with their free ends flush with the contact face of the section. Since each straight channel portion brings the fibers therein into orientation parallel to the central axis of the section, and within the lateral interstice 90, the fiber ends in each section are precisely equidistantly and angularly positioned for optical engagement with the fiber ends of the other section.

FIG. 3 and 5 show housing sections 100 and 102 constructed in accordance with an alternative embodiment of this invention. The sections 100 and 102 are similar to sections 20 and 22 except that the cusp shaped channels in both sections 100 and 102 spiral in the same direction throughout the entire length of each section so that there are no straight channel portions. In view of the identity of features between sections 20, 22 and 100, 102 save for the straight channel portions of the former, the same reference numerals are used with respect to housing sections 100 and 102 as are used to identify the features of the sections 20 and 22.

Since the sections 100 and 102 include helical spiral interstitial channels extending the entire length of each section, each fiber located in a channel therein assumes a position within the outer cusp-shaped interstice 88 at the ends of the section, e.g., at contact face 48. If each fiber is not closely fit and centered within its respective channel, each fiber end at the contact face 48 will extend at an angle α to the central axis 42. This factor limits somewhat the utility of the housing sections 100 and 102 in applications wherein there may be a substantial tolerance in the fiber and/or channel dimensions.

In accordance with the method aspects of this invention, the housing sections 20 and 22 and 100 and 102 are formed in a continuous process by disposing indeterminent lengths peripheral rods in a side-by-side array parallel to one another and about the periphery of an indeterminent length central rod. All the rods are heated and drawn while rotating them about the axis of the central rod to cause the peripheral rods to spiral about the central rod and to cause all of the rods to fuse together where they are in contact.

When making housing sections of the type like that shown in the embodiment of FIGS. 3 and 5, approximately three-inch (75.6 mm) lengths of spiralled section are severed from the continuous length drawn. Each three-inch section is in turn severed in its middle to form the relay pair housing sections 100 and 102. The faces formed by the midlength severance form the contact faces 48 for the housing section pair. If necessary, the contact faces are squared up and polished so that they each are planar and extend normally to the longitudinal central axis of the central rod. The outside ends 46 of each of the housing sections of the pair are heated to fire polish the ends so that the entrances to the channels are rounded off. This makes it easier to insert the fiber into the channels and also prevents the fibers from being scored during operation of the relay when the housing is rotated.

The fibers are then inserted in the channels through end 46 and are pushed all the way through the channels until each protrudes approximately ¼ inch (6.4 mm) beyond the contact face of the section. Epoxy or some other securement medium is then applied to the protruding fiber ends and the contact face. The fibers are then withdrawn slightly into the housing section until each only protrudes for approximately 1/32 inch (0.8 mm). This action draws the epoxy into the channels at the contact face and also allows the fibers to ride into the outer cuspshaped interstice 88. The epoxy is then allowed to cure. Once the curing is complete the epoxy and fiber ends at the contact face are removed, e.g., polished off, until the original contact face is exposed. In this operation care is taken not to remove any of the housing beyond the original contact face, since such action may result in misalignment of the fibers in the two sections when the relay is used.

Production of the preferred embodiment housing sections 20 and 22, like sections 100 and 102, is accomplished on a continuous basis using basically the same drawing and twisting process, described heretofore. However, during the drawing and twisting the rods are intermittently twisted in a reverse direction, first by a corresponding amount to produce a straight rod portion and then by a further amount to produce a helical spiral portion of the opposite sense, as shown in FIG. 2. The action produces straight rod portions interposed between helical rod portions. Short, e.g. three-inch (75.6 mm), sections are then severed from the continuous drawn material, with each three-inch section including a straight rod portion between helical spiral portions. The short section is then severed through the straight rod portion to form the pair of housing sections 20 and 22, with the plane of severance forming the contact faces 48 of the sections. The contact faces 48 of the sections are then polished, if necessary, the ends 46 fire polished and the fibers inserted and secured as described heretofore with respect to the housing sections 100 and 102.

The holding and adjustment means 26 is shown in FIG. 1 and basically comprises a planar base 104 upon which is disposed a generally V-shaped track 106 including a pair of sidewalls 108 disposed at an angle to each other. The track extends the entire length of the base 104 and serves to receive the pair of fiber housing sections 20 and 22 or 100 and 102 therein to align the sections linearly along the central axis 42. A fixed clamping assembly 110 is mounted on the base 104 adjacent to one end of the track 106 and an adjustable clamping assembly 112 is mounted on the base adjacent the opposite end of the track.

The fixed clamping assembly includes a vertical standard 114 having an aperture 116 at its upper end. One end of a clamping bar 118 is fixedly secured in the aperture. The bar 118 is a resilient metal rod which extends horizontally across the top of the track 106. An upstanding catch 120 is mounted on the opposite track from the standard 118 and includes a mouth 122 arranged to receive and hold the free end 124 of the clamping bar 118. The clamping bar 118 is arranged so that when its free end is within the catch's mouth its midportion makes contact with the fiber housing section 22 located in the track therebelow to apply a biasing force to the section to hold the section in place.

As will be appreciated by those skilled in the art, since the housing sections shown herein have six peripheral rods, there are six rotational positions in the track 106 which the sections can assume and remain stable. Such positions are positions of low energy and occur whenever peripheral portions of two immediately adjacent rods of the section are engaged by the clamping bar 118. Accordingly, when section 22 is initially disposed within track 106 it is placed at any longitudinal position therein so that two immediately adjacent peripheral rods are engaged by the clamping bar 118 as shown in FIG. 6.

The clamping bar 118 of the fixed clamping assembly is sufficiently resilient so that the housing section 22 can be rotated about its axis 42 against the urging of the biasing force produced by the bar.

The adjustable clamping assembly 112 includes a vertical standard 126 mounted on a slideable plate 128. The plate includes a slot 130 extending parallel to the track 106. The plate is arranged to be slid along the base 104 parallel to the track 106. A clamping bolt 132 extends through the slot 130 to lock the plate in place at any desired longitudinal position along the track. A handle 134 is connected to the bolt to enable it to be rotated to lock and unlock the plate. The standard 126 includes an aperture 136 at its upper end in which one end of a clamping bar 138 is fixedly secured. The clamping bar 138 is a resilient metal rod which extends horizontally across the top of the track 106 and includes a downward, triangular shaped projection 140 at the midpoint thereof. An upstanding catch 142 is mounted on a slideable plate (not shown) on the other side of the track from the standard 126. The plate with the catch thereon is also slideable longitudinally along the base and includes a clamping bolt (not shown) having a handle 144 similar to handle 134. The standard 142 includes a mouth 146 arranged to receive and hold the free end 148 of the clamping bar 138. The clamping bar is arranged so that when its free end is within the catch's mouth the midportion of the bar makes contact with peripheral portions of two rods of the fiber housing section 22 located in the track therebelow, while its triangular projection fits between the two peripheral rods, as shown in FIG. 7.

The clamping assembly 112 is arranged to be slid as a unit up or down the base 104. By moving the clamping assembly longitudinally along the base the triangular projection 140 rides within the space between the housing section's two peripheral rods engaged by the bar 138 to rotate the housing section 20 about its central longitudinal axis 42. This feature enables one to rotate the housing section 20 until the fibers in section 20 are aligned (in optical continuity) with the fibers in section 22. The adjustable clamping means 112 is then locked in place to prevent any further movement of the adjustable clamping assembly and section 20.

Once the sections 20 and 22 are disposed in optical alignment, optical signals in each fiber in one section can be coupled to the abutting fibers in the other section. In order to switch optical signals to different fibers all that is necessary is to rotate the housing sections relative to one another about axis 42 until the fibers to be connected are optically aligned. This action can be accomplished manually by hand rotation of section 22 or through the use of rotation producing means (not shown) such as an electrical motor, solenoid, etc., coupled to section 22.

The detent action produced by the fixed clamping bar 118 ensures that the section 22 assumes a low energy, stable rotational position. Accordingly, the fibers in one section will automatically align with the fibers in the other section at the new rotational position to produce good optical signal transmissive joints at the interfaces of the abutting fibers.

Refractive index matching liquid or grease may be used at the interface of the contact faces 48 of housing sections 20 and 22 to reduce friction and light loss. Alternatively, or in addition, a thin shim or bearing may be disposed between the contact faces to reduce surface wear and obviate possible fiber face damage due to rotation of the housing sections.

It must be pointed out at this juncture that other means can be used to provide a V-shaped groove for aligning the sections 20 and 22 or 100 and 102 in lieu of the track 106. For example, a pair of cylindrical members, lying side by side, creates a cusp-shaped V-groove therebetween in which said sections can be disposed. In fact, the use of a V-shaped alignment groove for the housing sections can be dispensed with. In such a situation alignment can be effected using housing sections 20 and 22 or 100 and 102 having tubular central members 28 through which a common alignment rod extends as taught in my aforenoted co-pending patent application. Alternatively, an elastomeric sleeve can be placed around the periphery of the abutting housing sections.

While the two housing sections 20 and 22 have been shown and described as having peripheral rods which spiral in opposite directions so that the fibers are located in the same lateral interstices, whereupon the fibers in the interstices of one section align with the fibers in the corresponding interstices of the other section when the channels are aligned, such a peripheral rod arrangement is merely a preferred embodiment and other arrangements are also suitable for effecting alignment of the fibers. For example, both housing sections 20 and 22 can have peripheral rods which spiral in the same direction. In such an alternative construction each fiber in one section will lie within the one lateral interstice, while each fiber in the other section will lie within the other lateral interstice. Hence, when the fibers are aligned, the cusp-shaped channels will be slightly offset from one another, i.e., offset by approximately the distance between the lateral cusps.

Moreover, the fibers in one housing section may be located in the section's outer cusp-shaped interstices 88, while the fibers in the other housing section are located within corresponding lateral cusps, and still effectuate fiber alignment if the rods forming the two sections are of appropriate diameter so that the outer cusps in one section and the lateral cusps in the other section are located the same radial distance from axis 42 and spaced the same angular distance from each other.

It must also be pointed out that while each housing section is illustrated as including six peripheral rods and one central rod, each housing section may include as few as three peripheral rods. Furthermore, each channel may be constructed to have more than three cusps. In such a construction the lateral peripheral rods which are in contact with the central rod are spaced from one another and one or more additional peripheral rods are connected between immediately adjacent peripheral rods but are spaced from the central rod.

It should be appreciated that it isn't necessary for every cusp-shaped channel in each section to have an optic fiber disposed therein. For example, the switch 10 can merely include a single fiber housed in one section and a pair of fibers housed in the other section, to permit the switching of optic signals between a pair of paths. Moreover, the switch 10 can be used as an ON/OFF switch by rotating the sections relative to each other until a fiber in one section is aligned with an empty cusp-shaped channel or a dummy fiber in a cusp-shaped channel of the other section.

As should be appreciated from the foregoing, the relay switch 10 of the instant invention is simple in construction and offers a viable approach to switching optical signals between plural paths. To that end the housing sections of the instant invention tolerate less precision in the size of the fibers and/or channel than the relay switch of my aforenoted patent application, while nevertheless effectuating precise optical alignment of the fibers by automatically positioning the fibers into predetermined interstices in the fiber holding channels. The housing sections of the preferred embodiment also ensure that abutting fibers are aligned angularly as well as axially despite the lack of close dimensional tolerances of the fibers or the channels in which they are disposed. Thus the preferred embodiment housing sections create very high tolerance fiber alignment in a relatively low tolerance assembly.

Furtherstill, the spiralled portions of the housing sections of all embodiments of the instant invention present a generally circular peripheral surface to the alignment track to facilitate body section alignment therein, while the detent action of the clamping bars acting on the periphery of the body section guarantees fiber registration.

The method of the instant invention provides a quick, easy and inexpensive technique for producing the fiber housing sections of the instant invention.

Without further elaboration, the foregoing will so fully illustrate my invention that others may, by applying current or future knowledge, readily adapt the same for use under various conditions of service.

What is claimed as the invention is:

1. A fiber optic relay switch for switching optical signals between a first fiber and a second and a third fiber; said switch comprising a first section for housing a first optic fiber and a second section for housing at least a second and a third optic fiber; said first and second sections each comprising a central cylindrical member having a longitudinal central axis and a plurality of peripheral cylindrical members surrounding said central member to form a plurality of interstitial channels therebetween; said peripheral members spiralling helically about said axis for at least a portion of said section so that the channels in said portion are helical; each of said sections terminating in a coupling face, each of said channels including at least three cusp-shaped interstices; one of said interstices being located furthest from said axis and the other interstices being located laterally of said one interstice and closer to said axis; said first fiber being located within a preselected interstice of a channel in said first section and with the end of the first fiber being aligned with the coupling face of the first section; said second fiber being located within a preselected interstice of a channel in said second section and with the end of the second fiber being aligned with the coupling face of the second section; said third fiber being located within a preselected interstice of another channel in said second section and with the end of said third fiber being aligned with the coupling face of said second section; said coupling faces of said first and second sections being slidably disposed with respect to each other so that in a first position the end of said first fiber is aligned with and optically coupled with the end of said second fiber and in a second position the end of said first fiber is aligned with and optically coupled with the end of said third fiber, whereby movement of said sections relative to each other between said first and second positions switches the optical signals from a first path to a second path.

2. A fiber optic relay switch for switching optical signals between a first fiber and a second and a third fiber; said switch comprising a first section for housing a first optic fiber and a second section for housing at least a second and a third optic fiber; said first and second sections each comprising a central member having a longitudinal central axis and a plurality of peripheral cylindrical members surrounding said central member to form a plurality of interstitial channels therebetween; said peripheral members spiralling helically about said axis for at least a portion of said section so that the channels in said portion are helical; each of said sections terminating in a coupling face defining one end and an opposed terminal end; each of said channels including at least three cusp-shaped interstices; said helical channels of each section being of such configuration that optic fibers inserted therein and terminating with such section coupling face are disposed in preselected interstices at said coupling face; said first and second section coupling faces being movable relative to each other whereby in a first coupling face position the end of an optic fiber in one section is optically coupled with the end of an optic fiber in said second section, and a second coupling face relative position the end of such optic fiber in said one section is optically coupled with the end of a different fiber in said second section, and relative movement of said switch sections between said first and second positions switches optical signals emitted by an optic fiber in such first section from a first path to a second path.

3. The relay switch of claim 2 in which a first optic fiber is disposed in a preselected channel interstice of said one relay switch section and two optic fibers are disposed in predetermined channel interstices of said second relay switch section; each of said fibers terminating with the coupling face of the relay switch section in which disposed.

4. The relay switch of claims 1 or 2 wherein the channels at the coupling face of both sections are axially aligned when said sections are in either the first or second positions.

5. The relay switch of claim 4 wherein the first, second and third fibers are located within said one interstice.

6. The relay switch of claims 1 or 2 wherein each of said peripheral cylindrical members is of the same outside diameter.

7. The relay switch of claims 1 or 2 wherein each of said cylindrical members is formed of glass.

8. The relay switch of claim 7 wherein said cylindrical members are fused together at their interfaces.

9. The relay switch of claims 1 or 2 wherein each of said peripheral cylindrical members is a rod.

10. The relay switch of claims 1 or 2 wherein each of said sections comprises at least three peripheral rods.

11. The relay switch of claims 1 or 2 wherein said central member comprises a rod.

12. The relay switch of claims 1 or 2 additionally comprising holding means to precisely hold said sections in either the first or second positions.

13. The relay switch of claim 12 wherein said holding means comprises a V-shaped track in which said sections are disposed.

14. The relay switch of claim 13 wherein said holding means additionally comprises a pair of clamping members extending over said track for engagement with respective sections disposed therein.

15. The relay switch of claim 14 wherein said members are releasably securable.

16. The relay switch of claims 1 or 2 wherein the peripheral cylindrical members in the portion of each section contiguous with the coupling face thereof extends linearly parallel to the longitudinal axis of said central member.

17. The relay switch of claim 16 wherein the channels at the coupling face of both sections are axially aligned when said sections are in the first or second positions.

18. The relay switch of claim 17 wherein all of said fibers are located in said laterally located interstices.

19. The relay switch of claim 18 wherein each of said peripheral cylindrical members is of the same outside diameter.

20. The relay switch of claim 19 wherein each of said cylindrical members is formed of glass.

21. The relay switch of claim 20 wherein said cylindrical members are fused together at their interfaces.

22. The relay switch of claim 21 wherein each of said peripheral cylindrical members is a rod.

23. The relay switch of claim 22 wherein each of said sections comprises at least three peripheral rods.

24. The relay switch of claim 22 wherein said central member comprises a rod.

25. The relay switch of claim 16 additionally comprising holding means to precisely hold said sections in either the first or second positions.

26. The relay switch of claim 25 wherein said holding means comprises a V-shaped track in which said sections are disposed.

27. The relay switch of claim 26 wherein said holding means additionally comprises a pair of clamping members extending over said track for engagement with respective sections disposed therein.

28. The relay switch of claim 27 wherein said members are releasably securable.

29. The relay switch of claims 1 or 2 wherein the pitch of the helically extending portion of said cylindrical members is defined by the formula:

$$P > \frac{2R_2(R + r)^2}{(2R + r^2)^{\frac{1}{2}}}$$

where P is the pitch of the peripheral rods where they spiral helically, R is the radius of the central cylindrical member of the section, r is the radius of the optic fibers and $R_2$ is the radius of the arc through which the fiber is bent in passing from the helical portion of the section to the linear portion of the section.

30. A method of making an optic fiber housing section for a fiber optic relay switch housing plural optic fibers therein and comprising a central, cylindrical, glass member having a longitudinal central axis and a plurality of peripheral glass members surrounding said central member to form a plurality of fiber-receiving interstitial channels therebetween; said peripheral members spiraling helically about said axis in a first direction for at least a portion of said section so that the channels in said portion are helical; said section terminating in a coupling face; said method comprising the steps of locating a plurality of elongated glass members about the periphery of said central cylindrical member with the longitudinal axis of each member parallel to said central axis, and heating said peripheral members and said central member while rotating said members in a first direction about said central axis to cause said peripheral members to spiral helically about the central axis in said first direction and fuse to each other and to said central member to form said interstitial channels.

31. The method of claim 30 additionally comprising the step of drawing said peripheral members and central member down in size while said members are hot.

32. A method of making an optic fiber housing section for a fiber optic relay switch housing plural optic fibers therein, and comprising a central member having a longitudinal axis and a plurality of heat-softenable peripheral cylindrical members surrounding said central member to form a plurality of interstitial fiber-receiving channels therebetween; said peripheral members spiraling helically about said axis in a first direction for at least a portion of said section so that the channels in said portion are helical; said section terminating in a mating face; said method comprising the steps of locating a plurality of elongated heat-softenable members about the periphery of said central member with the longitudinal axis of each member parallel to the longitudinal axis of said central member; deforming said peripheral members about said central member while rotating said members in a first direction about said central axis to cause said heat softenable peripheral members to spiral helically about the central axis in said first direction to form said helical, fiber-receiving interstitial channels.

33. The method of claims 30 or 32 wherein said peripheral cylindrical members are rods.

34. The method of claim 33 wherein there are at least three peripheral rods.

35. The method of claims 30 or 32 wherein said central member is a rod.

36. The method of claims 30 or 32 additionally comprising the steps of severing a length of section into a pair of sections.

37. The method of claims 30 or 32 wherein said housing section includes a portion in which said peripheral members are straight and extend parallel to said central axis, said method additionally comprising the step of intermittently rotating said members in a second direction opposite to said first direction to compensate for said rotation in the first direction and to form the straight rod portion.

38. The method of claim 37 additionally comprising the step of drawing said peripheral members and central member down in size while said members are hot.

39. The method of claim 38 wherein said peripheral cylindrical members are rods.

40. The method of claim 39 wherein said central member is a rod.

41. The method of claim 40 wherein there are at least three peripheral rods.

42. The method of claim 37 additionally comprising the step of severing a length of section at a point in said straight rod portion to form a pair of sections each having one end including a straight rod portion.

43. The method of claim 37 wherein after said straight rod portion is formed said members are further rotated in said second direction to cause said peripheral members to spiral helically about the central axis in said second direction.

44. The method of claim 43 additionally comprising the step of severing a length of section at a point in said straight rod portion to form a pair of sections, each having one end including a straight rod portion.

* * * * *

UNITED STATES PATENT AND TRADEMARK OFFICE
CERTIFICATE OF CORRECTION

PATENT NO. : 4,245,885
DATED : January 20, 1981
INVENTOR(S) : Malcolm H. Hodge

It is certified that error appears in the above–identified patent and that said Letters Patent are hereby corrected as shown below:

Column 4, line 5, change "of" to -- at --

Column 7, line 13, change "Fig." to -- Figs. --

Column 8, line 21, change "The" (second occurrence) to -- This --

Column 13, line 14, (Claim 19), cancel "of"

Column 13, claim 29, correct the formula as follows:

$$P > \frac{2R_2 (R + r)^2}{(2Rr + r^2)^{1/2}}$$

Signed and Sealed this

Sixteenth Day of June 1981

[SEAL]

Attest:

RENE D. TEGTMEYER

Attesting Officer    Acting Commissioner of Patents and Trademarks